United States Patent
Apolonski et al.

(10) Patent No.: US 7,903,705 B2
(45) Date of Patent: Mar. 8, 2011

(54) SHORT PULSE LASER DEVICE

(75) Inventors: Alexander Apolonski, Garching bei München (DE); Ferenc Krausz, Garching bei München (DE); Andreas Stingl, Korneuburg (AT); Alexander Fürbach, Vienna (AT)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 10/579,000

(22) PCT Filed: Oct. 4, 2004

(86) PCT No.: PCT/AT2004/000336
§ 371 (c)(1), (2), (4) Date: Aug. 18, 2006

(87) PCT Pub. No.: WO2005/048419
PCT Pub. Date: May 26, 2005

(65) Prior Publication Data
US 2007/0086493 A1 Apr. 19, 2007

(30) Foreign Application Priority Data
Nov. 13, 2003 (AT) .................................. A 1827/2003

(51) Int. Cl.
*H01S 3/13* (2006.01)
*H01S 3/10* (2006.01)
(52) U.S. Cl. ............................................. 372/30; 372/25
(58) Field of Classification Search .................. None
See application file for complete search history.

(56) References Cited

U.S. PATENT DOCUMENTS
5,701,327 A * 12/1997 Cunningham et al. .......... 372/98
5,734,503 A     3/1998 Szipócs et al. ................. 359/584
2005/0238070 A1* 10/2005 Imeshev et al. ................. 372/21

FOREIGN PATENT DOCUMENTS
AT    405 992 B    11/1999
AT    411411       11/2003
WO    WO 01/05000 A    1/2001

OTHER PUBLICATIONS

International Preliminary Report on patentability dated Oct. 4, 2004.
Cho S H et al: Generation of 90-NJ Pulses with a 4-MHZ Repetition-Rate Kerr-Lens Mode-Locked TI: AL 203 Laser Operating with Net Positive and Negative Intracavity Dispersion: Optic Letters, Optical Society of America, Washington, US, vol. 26, No. 8, Apr. 15, 2001, pp. 560-562, ISSN: 0146-9592 cited in the application.

(Continued)

*Primary Examiner* — Minsun Harvey
*Assistant Examiner* — Sean Hagan
(74) *Attorney, Agent, or Firm* — Ostrolenk Faber LLP (57) ABSTRACT

A short pulse laser arrangement with, preferably, passive mode-locking, comprising a resonator containing a laser crystal and several mirrors, one of which forms a pump beam coupling-in mirror and one of which forms a laser beam out-coupling mirror, and a multiple reflexion telescope enlarging the resonator length, the resonator in operation having a positive averaged dispersion over a wavelength range concerned; the adjustment of the positive averaged dispersion of the resonator is effected by means of the mirrors of the resonator, at least a few of which are designed as dispersive mirrors.

11 Claims, 4 Drawing Sheets

OTHER PUBLICATIONS

Matuschek N. et al: "Analytical design of double-chirped mirrors with custome-tailored dispersion characteristics" IEEE Journal of Quantum Electronics, IEEE Inc. New York, US, vol. 35, No. 2. Feb. 1999, pp. 129-137, XP002109637 ISSN: 0018-9197.

Stingl A et al: Generation of 11-FS Pulses from a TI: Sapphire Laser without the useof Prisms Optics letters, optical society of america, Washington, US, vol. 19, No. 3, Feb. 1, 1994, pp. 204-206, XP000424365 ISSN: 0146-9592.

D. Herriott etal., "off-Axis Paths in Spherical Mirror Interferometers". Applied Optics, Apr. 1964, vol. 3, No. 4, pp. 523-526.

A. Poppe et al., "A Sub-10 fs, 2.5-MW Ti: Sapphire Oscillatore", Ultrafast Optics 1999, pp. 154-157, Ascona, Switzerland.

"Compact femtosecond lasers based on novel multipass cavities" by A. Senaroglu et al., IEEE Journal of Quantum Electronics, vol. 40, No. 5, May 2004, pp. 519-528.

"Characterization of a Kerr-lens mode-locked Ti:sapphire laser with positive group-velocity dispersion" by Bob Proctor et al. Optics Letters, vol. 18, No. 19, Oct. 1, 1993, pp. 1654-1656.

"Structures for additive pulse mode locking" by H.A. Haus et al., J. Opt. Soc. Am. B, vol. 8, No. 10, Oct. 1991, pp. 2068-2076.

V. Kalashnikov et al., "Approaching the microjule frontier with femtosecond laser oscillators: theory and comparison with experiment", *New Journal of Physics*, 7 (2005) 217, pp. 1-16.

* cited by examiner

SHORT PULSE LASER DEVICE

CROSS REFERENCE TO RELATED APPLICATION

The present application is a 35 U.S.C. §§371 national phase conversion of PCT/AT2004/000336, filed 4 Oct. 2004, which claims priority of Austrian Patent Application No. A 1827/2003 filed 13 Nov. 2003, which is herein incorporated by reference. The PCT International Application was published in the German language.

BACKGROUND OF THE INVENTION

The invention relates to a short pulse laser arrangement with preferably passive mode-locking and comprising a resonator containing a laser crystal as well as a plurality of mirrors, one of which forms a pump beam in-coupling mirror and one of which forms a laser beam out-coupler, and a multiple reflexion telescope enlarging the resonator length, the resonator in operation having a positive averaged dispersion for a wave-length range concerned.

SUMMARY OF THE INVENTION

Recently, short pulse laser arrangements have been of increasing interest, since with a view to the extremely short pulse durations in the femtosecond range, with pulse peak power of >1 MW, advantageous applications are made possible in research and industry. Thus, such short pulse laser arrangements having pulse durations in the femtosecond range can be used for a time-resolved investigation of the interaction between electromagnetic radiation and matter. What is desirable is a laser arrangement which generates laser pulses having a pulse duration in the range of e.g. 10 fs (femtoseconds) as well as with an energy of 100 nJ, e.g., at a pulse repetition rate in the order of 10 MHz. The pulse repetition rate which is comparatively low (in the order of a few MHz instead of, e.g., approximately 100 MHz) as compared to earlier laser arrangements in the femtosecond range in a conventional titanium-sapphire fs-laser is desired because then a higher pulse peak intensity can be attained which, for many applications, is in the range of larger than $10^{13}$ W/cm$^2$. Purely calculative, such comparatively low repetition rates which, vice versa, mean a relatively long pulse round-trip time in the laser resonator, entail a corresponding increase in the length of the resonator, e.g. from 2 m to 16 m, thereby increasing the dimensions of the laser arrangement.

Based on an earlier work by D. Herriott et al., "Off-Axis Paths in Spherical Mirror Interferometers", Applied Optics, April 1964, Vol. 3, No. 4, pp. 523-526, an extension of the pulse round-trip time in a laser arrangement by providing a multiple-pass resonator part, also termed "multiple reflexion" telescope, or "telescope" in short, has already been proposed, cf. e.g. AT-A-763/2002; or S. H. Cho et al., "Generation of 90-nj pulses with a 4-MHz repetition-rate Kerr-lens mode-locked Ti:Al$_2$O$_3$ laser operating with net positive and negative intracavity dispersion", Optics Letters, 15 Apr. 2001, Vol. 26, No. 8, pp. 560-562; as well as A. Poppe et al., "A Sub-10 fs, 2.5-MW Ti:Sapphire Oscillator", Ultrafast Optics 1999, pp. 154-157, Ascona, Switzerland (1999). With such a telescope it becomes possible to increase the pulse round-trip time in a constructively advantageous manner by multiple passes, due to a plurality of reflexions on oppositely arranged mirrors, and to thereby reduce the repetition rate, e.g. from approximately 100 MHz to a few MHz. By this, it is possible to appropriately increase the energy portion of the pulse part that is out-coupled per round trip, i.e. at an unchanged average output power, a markedly increased output pulse energy as well as a peak power can be achieved.

In this respect, however, non-linear optical effects proved to be disadvantageous and restrictive, which effects occur due to the high peak intensity in the laser crystal, and which lead to a splitting of the respective high-energy light pulses circulating in the resonator into several weaker pulses. This can be counteracted in that the amount of the (negative) resonator dispersion is increased which, however, inevitably will lead to a reduction in the attainable band width and, thus, to markedly longer pulse durations. On the other hand, it has already been suggested in the previously mentioned article by S. Cho et al., "Generation of 90-nJ pulses with a 4-MHz repetition rate Kerr-lens mode-locked Ti:Al$_2$O$_3$ laser operating with net positive and negative intracavity dispersion", to operate the laser arrangement at an overall positive dispersion, wherein then highly chirped pulses form in the pico-second range, i.e. pulses of a markedly reduced peak power. By a So-called "compressor" (with prisms, with grids, with mirrors or with a combination thereof, respectively), set-up externally, i.e. externally of the resonator, the pulses subsequently can be compressed again to pulse durations of a few femtoseconds, accompanied by an increase in the peak power. According to the said document by S. Cho et al., in this state of operation a (relatively small) spectral band width of 19 nm and a pulse duration of 80 fs has been achieved. A pair of prims has been used for the dispersion control within the resonator.

Investigations have shown, however, that for obtaining a larger band width and, therefore, shorter pulses, it would be necessary for the net total dispersion in the resonator to be as constant as possible over the respective desired spectral range. However, it has been shown that a pair of prisms inevitably also introduces a dispersion of higher order (i.e., the dispersion of the $2^{nd}$ order (GDD) is not constant over the band width), and that the known arrangement in fact is not suitable to generate the shorter pulses and larger band widths sought.

It is now an object of the invention to provide a remedy for this and to provide a short pulse laser arrangement of the initially defined type with which it is possible to efficiently achieve the short laser pulses sought and the large band width desired.

The inventive short pulse laser arrangement of the initially defined type is characterized in that the adjustment of the positive averaged dispersion of the resonator is effected by means of the mirrors of the resonator, at least a few of which are designed as dispersive mirrors in a manner known per se.

By combining various dielectric, dispersive mirrors, it becomes possible in the present short-pulse laser arrangement to attain a nearly arbitrary dispersion course over the laser frequencies provided, it being known per se, to design the mirrors which are made up with a plurality of dielectric layers (the construction and effect of which will be explained in more detail hereinafter) such that—based on the choice of material and the choice of the layer thickness—in each case a desired dispersion can be achieved in the wave length region in question. Therefore, it is subsequently possible to adjust the total dispersion in the resonator, which results from the sum of the dispersion values of all the laser components, i.e. from the dispersion of the laser crystal, the air in the resonator, the mirrors and any possible additional components, such that the total dispersion, averaged over the spectral range of the pulse spectrum, yields a positive value so as to achieve the desired state of operation in which the pulses are highly chirped in the resonator and, therefore, the peak intensity is lowered. In particular, it is also possible over a wide wave length range to keep the total dispersion in the positive dispersion range within a tolerance band, so that a comparatively large band width—and thus, an extremely slight Fourier-limited pulse duration—is achieved. This is enabled in the simplest manner with the dispersive mirrors indicated, wherein individual mirrors which each have different dispersion courses with unavoidable fluctuations are combined, depending on the aim sought, so as to achieve the desired total dispersion course, e.g. over a wave length range of more than 280 nm. With appropriately designed dispersive mirrors exhibiting slight fluctuations in the dispersion behavior, even larger wave length ranges can be achieved with a total dispersion course within the chosen or predetermined tolerance limits.

In order to ensure as large a band width as possible, it also proved to be advantageous if the positive total dispersion range is chosen such that the averaged dispersion is only comparatively slightly positive, lying, e.g., in a range of between 0 and 100 $fs^2$, in particular in a range of between 0 and 50 $fs^2$.

For the dispersion control in principle only individual mirrors of the resonator can be employed; to optimally utilize all the possible adjustments, advantageously all the mirrors of the resonator are designed as dispersive mirrors, preferably with negative dispersion. For this reason, moreover, also the mirrors of the multiple reflexion telescope are provided as dispersive mirrors, preferably with negative dispersion.

In many cases it may also prove to be suitable if a (small) variable amount of positive dispersion is introduced in the resonator for a supplementary dispersion fine adjustment, e.g. by means of two closely adjacently arranged and oppositely oriented, per se known glass wedges.

To adjust the desired positive net dispersion of the resonator, it may in principle also be provided for the use of a pair of prisms in combination with the dispersive mirrors indicated, even though, as a rule, a dispersion control using the dispersive mirrors alone, optionally with the aforementioned glass wedges, will be preferred.

For the preferred passive mode-locking (within the scope of the invention, in principle also active mode-locking would be conceivable), in the present short pulse laser arrangement the per se known "Kerr-lens mode-locking" principle may be provided, yet, as is also known per se, also an saturable absorber may be provided. The saturable absorber may be arranged in the beam path in the resonator, yet preferably also an end mirror of the resonator may be provided as saturable absorber-reflector.

The inventive short pulse laser arrangement may particularly advantageously be employed in the field of material processing, where in the course of the increasing miniaturization, the finest structures must be fabricated with exactness and at a high speed. The present short pulse laser arrangement which allows for a high output pulse energy and a high repetition rate can be ideally employed for this, wherein it proves particularly advantageous that with the present short pulse laser arrangement working slightly above the destruction threshold (i.e. the threshold energy for material destruction) is possible, wherein due to the said high repetition rate and the plurality of the pulses delivered a high ablation rate and, nevertheless, fine processing can be achieved.

In the following, the invention will be further explained by way of preferred exemplary embodiments illustrated in the drawings, without, however, being restricted thereto. Therein,

DESCRIPTION OF A PREFERRED EMBODIMENT

Figure 1:
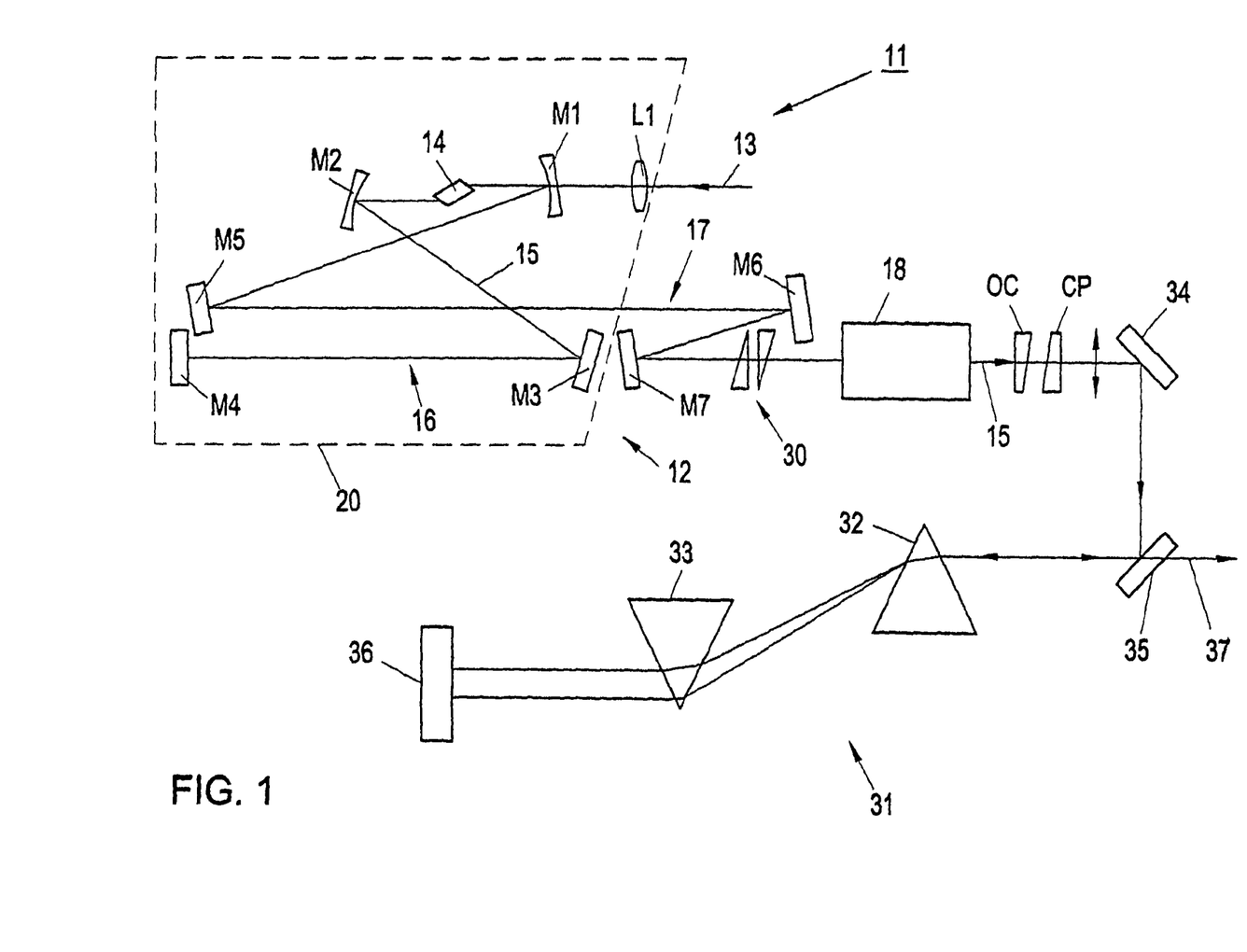
FIG. 1 diagrammatically shows the structure of a short pulse laser arrangement with telescope according to the invention.

In FIG. 1, a short pulse laser arrangement 11 is schematically illustrated, in which e.g., the per se known Kerr-lens mode-locking principle is used for generating the short pulse.

The laser arrangement 11 of FIG. 1 comprises a resonator 12, to which a pump beam 13 is supplied from a pump laser, e.g. from a frequency-doubled solid laser. The pump laser itself has been omitted in FIG. 1 for the sake of simplicity and is part of the prior art.

After having passed a lens L1 and a dichroic mirror M1, the pump beam 13 excites a laser crystal 14, a titanium:sapphire (Ti:S) solid laser crystal in the present example. The dichroic mirror M1 is permeable for the pump beam 13, yet highly reflective for the Ti:S laser beam. This laser beam 15, the resonator beam, then impinges on a laser mirror M2 and is reflected by the latter to a laser mirror M3. This laser mirror M3 again reflects the laser beam to a laser mirror M4, and from there the laser beam 15 is reflected back to the laser mirrors M3, M2 and M1, passing the laser crystal 14 a second time. This resonator part with the mirrors M2, M3 and M4 forms a so-called short resonator arm 16.

From mirror M1, the laser beam 15 is then reflected to a laser mirror M5, and from there to a laser mirror M6 as well as to a further laser mirror M7, whereby a second, long resonator arm 17 is formed. From the laser mirror M7, the laser beam 15 gets into a telescope 18 merely schematically shown in FIG. 1, and from there it gets to an end mirror serving as an out-coupling mirror OC. Via this out-coupling mirror OC, a part of the laser beam 15 is coupled out with the provision of a compensation possibility, a compensation platelet CP being shown in FIG. 1 by way of example.

The laser crystal 14 is a plane-parallel body which is optically non-linear and forms a Kerr element which has a larger effective optical thickness for higher field strengths of the laser beam 15, yet has a smaller effective thickness where the field strength, or intensity, respectively, of the laser beam is lower. This per se known Kerr effect is utilized for self-focusing of the laser beam 15, i.e. the laser crystal 14 forms a focusing lens for the laser beam 15. Mode-locking may, moreover, be realized in a per-se conventional manner, e.g. by means of an aperture not further illustrated in FIGS. 1 and 2 (cf. e.g. AT 405 992 B); it would, however, also be conceivable to design one of the end mirrors, e.g. M4, as saturable Bragg reflector, or saturable absorber, respectively, and thus to employ it for mode-locking.

The mirrors M1, M2 . . . M7 are carried out in thin film technique, i.e. they are each made up of many layers which exert their function during the reflection of the ultra-short laser pulse which has a large spectral band width, and introduce a "tailored" dispersion. These mirrors either utilize resonant processes (Gires Tournois Interferometer, GTI), or they are so-called chirped mirrors. With these, the different wave length components of the laser beam 15 penetrate to different depths into the layers of the respective mirror before they are reflected. By this, the different wave length components are delayed differently long at the respective mirror; the short-wave components are reflected further outwardly, e.g. (i.e., towards the surface), whereas the long-wave components are reflected deeper within the mirror. By this, the long-wave components are temporally delayed relative to the short-wave components. In this way, a dispersion compensation is obtained insofar as pulses which are particularly short in the time range (preferably in the range of 10 fs or below) have a broad frequency spectrum; this is due to the fact that the different frequency components of the laser beam 15 in the laser crystal 14 "see" a different refraction index, i.e. the optical thickness of the laser crystal 14 is differently large for the different frequency components, and the different frequency components therefore are differently delayed when passing through the laser crystal 14. This effect is counteracted by the aforementioned dispersion compensation on the thin film laser mirrors M1, M2 . . . M7.

As has already been mentioned, in operation, during each round-trip of the laser beam 15 in the short resonator arm 16 as well as in the long resonator arm 17, a part (e.g. 30%) of the laser pulse is out-coupled by means of the out-coupling mirror OC. In practice, the length of a laser resonator 2 may be approximately 2 m without telescope 18, whereas e.g. a repetition rate corresponding to a frequency of 75 to 100 MHz, e.g. 80 MHz, is achieved. In order to attain a higher pulse peak power, i.e. pulse energy, by increasing the round-trip time and, thus, by reducing the repetition rate, for instance with a view to using the laser arrangement 11 for material processing, the length of the laser resonator 12 is increased by installing the telescope 18. In case of an eight-fold increase of the total resonator length, i.e. for instance with a resonator length of approximately 15 m or 16 m, the repetition rate may then be at approximately 10 MHz, e.g. To obtain these long path lengths for the laser pulses, a mirror arrangement is provided in the telescope 18 so as to attain a multiple reflexion of the laser beam 15 so that the construction length of the telescope 18 can be shortened in accordance with the multiple reflexions.

Figure 2:
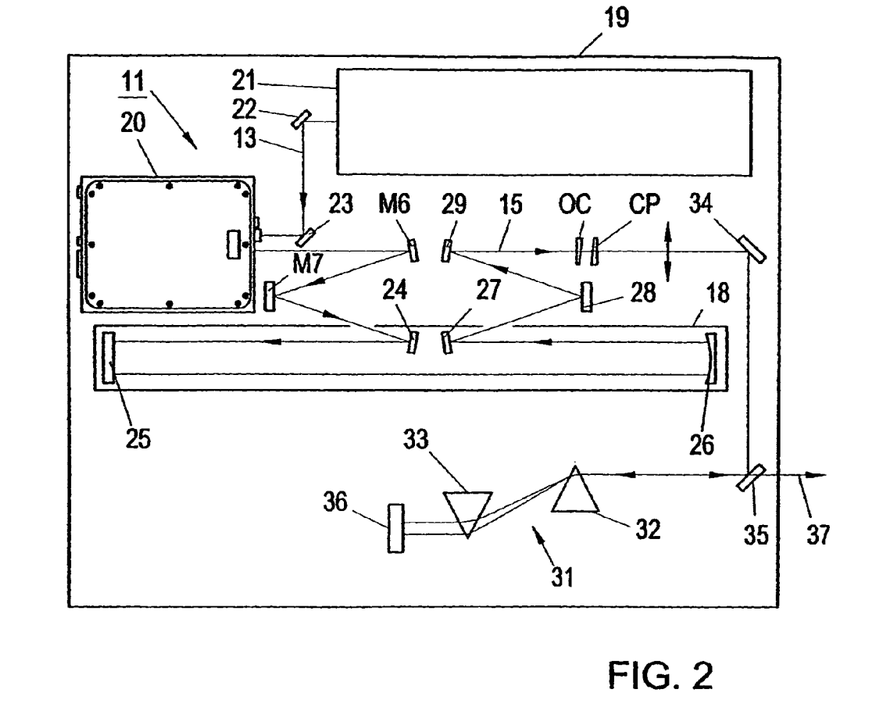
FIG. 2 shows such a short pulse laser arrangement as arranged on a mounting plate, wherein also coupling-in and out-coupling of the laser beam in the region of the telescope is schematically illustrated.

In FIG. 2, such a laser arrangement 11 according to FIG. 1 provided on a rectangular mounting plate 19 is schematically illustrated, which plate has a size of e.g. 900 mm×450 mm. On this mounting plate 19, the part 20 of the laser resonator 12 framed in broken lines in FIG. 1 is attached encapsulated in a housing, and furthermore, also the pump laser 21 is arranged on the mounting plate 19, from which the pump beam 13 is supplied to the laser resonator 20 via two mirrors 22, 23. From this resonator part 20, the laser beam 15 emerges in the direction of the laser mirror M6, from which it is reflected to laser mirror M7, as described before. From there, the laser beam 15 gets into the telescope 18, wherein a coupling-in mirror 24 is arranged in the telescope 18, e.g. in a housing, in one of the several beam paths between two oppositely arranged telescope mirrors 25, 26. This coupling-in mirror 24 reflects the laser beam 15 to the one—in FIG. 2 left-hand—plane telescope mirror 25 which then reflects the laser beam 15 to the oppositely arranged, concavely curved telescope mirror 26. Between these two telescope mirrors 25, 26, the laser beam 15 is then reflected back and forth several times, e.g. eight times, wherein on the concavely curved telescope mirror 26 a total of 8 reflexion points in this example, corresponding to the eight laser beam reflexions, are provided on an imaginary circle line around the center of the concave mirror 26, which, moreover, is explained in more detail in AT-A-763/2002.

Finally, the laser beam 15 is out-coupled from the telescope 18 by means of a telescope out-coupling mirror 27 arranged in the vicinity of the coupling-in mirror 14 and in the same beam path as the latter, said out-coupling mirror reflecting the laser beam 15 to a further mirror 28, and from there the laser beam 15 gets to the out-coupling mirror OC via a mirror 29. These mirrors 28, 29 (and, likewise, the mirrors 22 to 27) are not further illustrated in the schematic illustration according to FIG. 1 for the sake of simplicity.

An important aspect in a short pulse laser arrangement with an extended laser pulse round trip time is the stability of the laser oscillation, wherein an appropriate adaptation must be carried out with a view to the images of the laser beam cross-section caused by the individual mirrors. A further significant aspect which is particularly important for industrial applications, i.e. in case of material processing, is the compactness of the laser device 11; the aforementioned dimensions of, e.g., 900 mm×450 mm, correspond to conventional laser devices for industry, wherein, here, however (cf. FIG. 2), the telescope part 18—which may also form a separate construction unit—is additionally installed, so that the desired longer round-trip times of the laser beam 15 and, thus, the higher pulse energies can be achieved without an enlargement of dimensions. What is sought is pulse energies in the order of several hundred nJ instead of less than 10 nJ, as has previously been the case. Thus, peak pulse outputs of more than 2 MW can be attained.

In practice, however, it has been shown that due to the high peak intensities, non-linear optic effects occur in the laser crystal which have proven to be restrictive for the desired effect of achieving an increased output pulse energy, or peak output, respectively, at a constant average output power. In particular, the said non-linear optic effects lead to a splitting of the high-energetic laser pulses circulating in the resonator of the laser arrangement into several pulses of lower intensities each. To counteract this, an operation of the laser oscillator, or laser resonator, respectively, in a net-positive dispersion range is suitable, in which case highly chirped pulses will form in the pico-second range which have a markedly reduced peak power. In the prior art (cf. S. Cho et al., as indicated at the beginning) it has been suggested in this context to compress again the laser pulses subsequently to pulse durations of a few fs externally of the resonator, in a "compressor" made up by means of prisms, grids or mirrors, or a combination thereof, respectively, with the peak power being increased again accordingly. For an overall adjustment of the dispersion in the resonator, a pair of prisms has been used according to this prior art.

However, it has been shown that for attaining shorter pulses and, therewith, a larger band width, it is necessary that the entire dispersion in the resonator is kept as constant as possible over the respective spectral range (i.e. the respective band width), wherein it is furthermore advantageous if the entire dispersion is only slightly positive, i.e. is only little above zero, in particular amounts to only a few 10 $fs^2$. However, a resonator provided by a pair of prisms, as found in the prior art, will of necessity cause a dispersion of higher order, so that the desired constancy over the band width sought cannot be achieved. This is apparent from the illustration in FIG. 3, in which the dispersion course of a compressor realized with prisms of fused silica is shown. It can be seen that in a wave length range of from 700 nm to 900 nm, the dispersion GDD (GDD—group delay dispersion) is from below −250 $fs^2$ to slightly below −50 fs², a maximum of above −50 fs² being found at approximately 850 nm. Thus, in the spectral range indicated, the fluctuation of the GDD is more than 200 fs². With such a course of the dispersion it is not possible to produce the short laser pulses sought.

Figure 3:
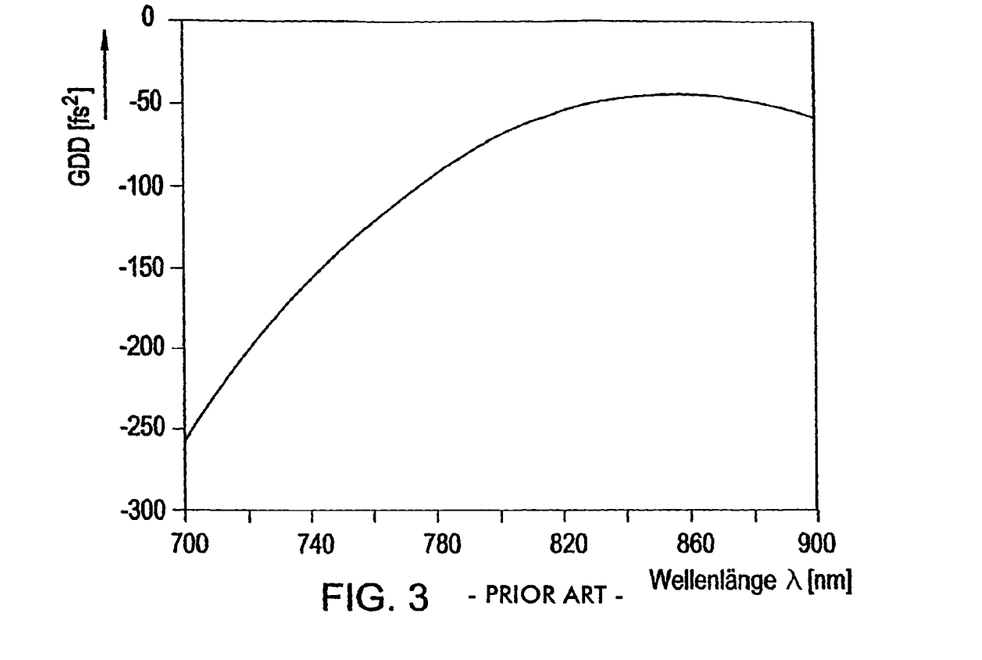
FIG. 3 shows the course of dispersion of a pair of prism according to the prior art in a diagram.
Figure 4:
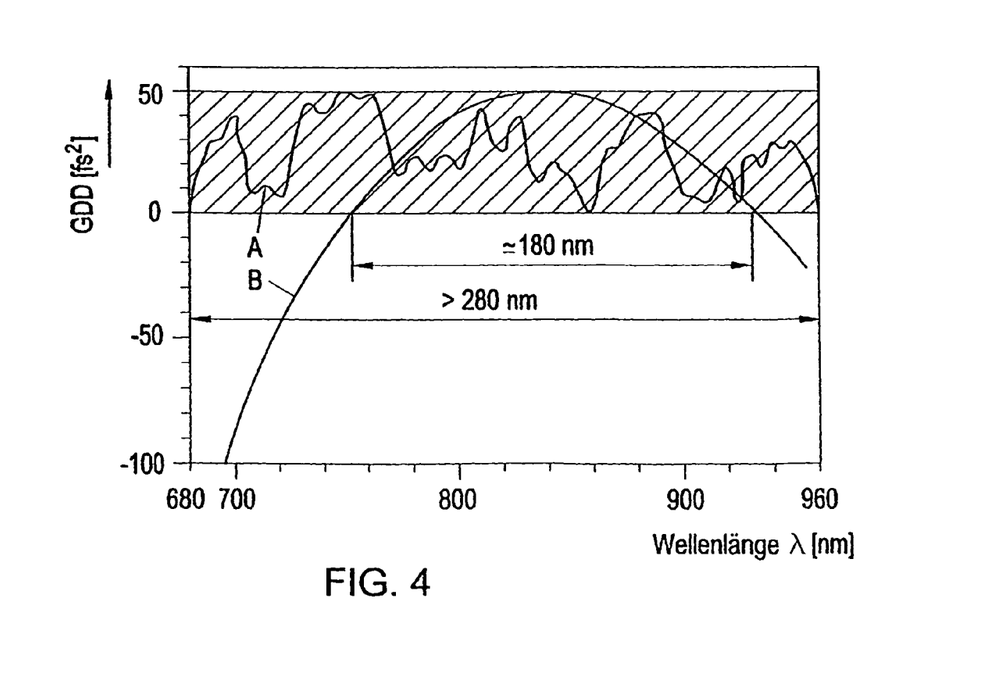
FIG. 4 in two curves A, B shows the course of dispersion with an inventive short pulse laser arrangement (curve A), and with a laser arrangement according to the prior art, respectively, with so-called fused silica prisms for introducing a negative dispersion in the resonator (curve B)

In the present short pulse laser arrangement 11, however, a dispersion adjustment is effected by means of various dielectric mirrors, e.g. M1 to M7, optionally also the telescope mirrors 26, 27 etc., wherein dispersive mirrors of appropriate construction in terms of layer structure and layer thicknesses, which are known per se, are combined together with the remaining elements of the laser arrangement 11 to thereby adjust the desired positive net dispersion of the entire resonator 12. In doing so, the dispersion is kept within a band range of from 0 to 100 fs², preferably from 0 to 50 fs², as schematically illustrated in the hatched region in FIG. 4, wherein curve A illustrates the dispersion course in a practical exemplary embodiment of the invention. For the purpose of a comparison, in FIG. 4 by means of a curve B also the dispersion course is shown which is obtained when, according to the prior art, a pair of prisms is used for the dispersion control (cf. S. Cho et al.). In combination with the remaining components of the laser resonator 12, the pair of prisms whose dispersion course is schematically illustrated in FIG. 3 gives rise to the net dispersion course shown by curve B, it being visible that only over a band width of approximately 180 nm the dispersion is within the range sought, i.e. between 0 and 50 fs². On the other hand, the dispersion according to curve A is within the band sought, i.e. from 0 to 50 fs², in the entire spectral range illustrated, from 680 nm to 960 nm, i.e. within a band of at least 280 nm, as a rule even in a larger band. As regards curve B, is must additionally be said that the prisms of fused silica are already characterized by a relatively slight dispersion of higher order and, therefore, must already be considered as optimized, wherein, however, the result still is substantially poorer than it is in case of the inventive dispersion adjustment by means of the dispersive mirrors.

The use of dispersive mirrors for a dispersion control yields the required negative dispersion within the resonator 12 to balance out the positive dispersion introduced by other components. Thus, e.g., the laser crystal 14 introduces a positive dispersion, just as does the air contained in the resonator 12. Optionally, as illustrated in FIG. 1 by way of example, two variable, i.e. adjustable, glass wedges 30 may be arranged in the resonator 12, e.g. in front of the telescope 18, to provide for an additional positive dispersion, wherein these two glass wedges 30 may be made of fused silica.

At the present short pulse laser arrangement 11, in order to compress the pulses again to pulse durations of a few fs, after they have been chirped in the resonator, an external "compressor" 31 is provided, as is visible in FIGS. 1 and 2, which also is mounted on the mounting plate 19 (cf. FIG. 2), which, however, may also form a separate construction unit, similar as telescope 18. In FIGS. 1 and 2, this "compressor" 31 which is made up with prisms 32, 33 is schematically indicated. As can be seen in detail, the laser beam which has been out-coupled via the out-coupling mirror OC is reflected at a mirror 34 to a mirror 35 which, in turn, reflects the laser beam to the two aforementioned prisms 32, 33, where the laser beam at first is fanned during its forward travel (towards the left according to the illustrations in FIGS. 1 and 2), until it is reflected at an end mirror 36. During the return travel of the laser beam through the prisms 33 and 32, the laser beam, which previously has been broadened due to the different wave lengths in the spectrum and due to the different travel times associated therewith, is bundled again, wherein its course is somewhat offset relative to the forward traveling laser beam and by this is out-coupled past the mirror 35, as indicated by an arrow 37 in FIG. 1.

In a concrete exemplary embodiment, the dispersion values indicated in the following table have been obtained for the individual elements, and for the entire resonator 12, respectively, at the indicated wave lengths of 700 nm, 800 nm and 900 nm.

TABLE

| | Laser Crystal 14 | Air | Telescope 18 | Glass Wedges 30 | Dispersive Mirrors | Total |
|---|---|---|---|---|---|---|
| 700 nm | +430fs² | +669fs² | −1690fs² | +1078fs² | −447fs² | +40fs² |
| 800 nm | +348fs² | +562fs² | −1460fs² | +865fs² | −297fs² | +18fs² |
| 900 nm | +277fs² | +486fs² | −1510fs² | +682fs² | −74fs² | +9fs² |

In the example considered here, a Ti:Sapphire crystal having a thickness of 3 mm was used as the laser crystal 14, which means that after two round trips, as described above, a total thickness of 6 mm must be taken into consideration. Besides, these two round trips from the out-coupling mirror OC until its return to the out-coupling mirror OC also hold for all other elements.

In the exemplary resonator 12 with a 10 MHz repetition rate, there was a length of 15 m per round trip so that a corresponding dispersion by the air in resonator 12 had to be taken into consideration.

In telescope 18, eight reflexions each per pass and per telescope mirror 25, or 26, respectively, had to be taken into consideration.

The glass wedges 30 in resonator 12 which additionally introduce a positive dispersion had a thickness of 12 mm, i.e. a total of 24 mm had to be considered for the two passes.

For a dispersion adjustment, furthermore, especially six dispersive mirrors M6, M7, 24, 27, 28 and 29 were used which were of an appropriate mirror design.

Figure 5:
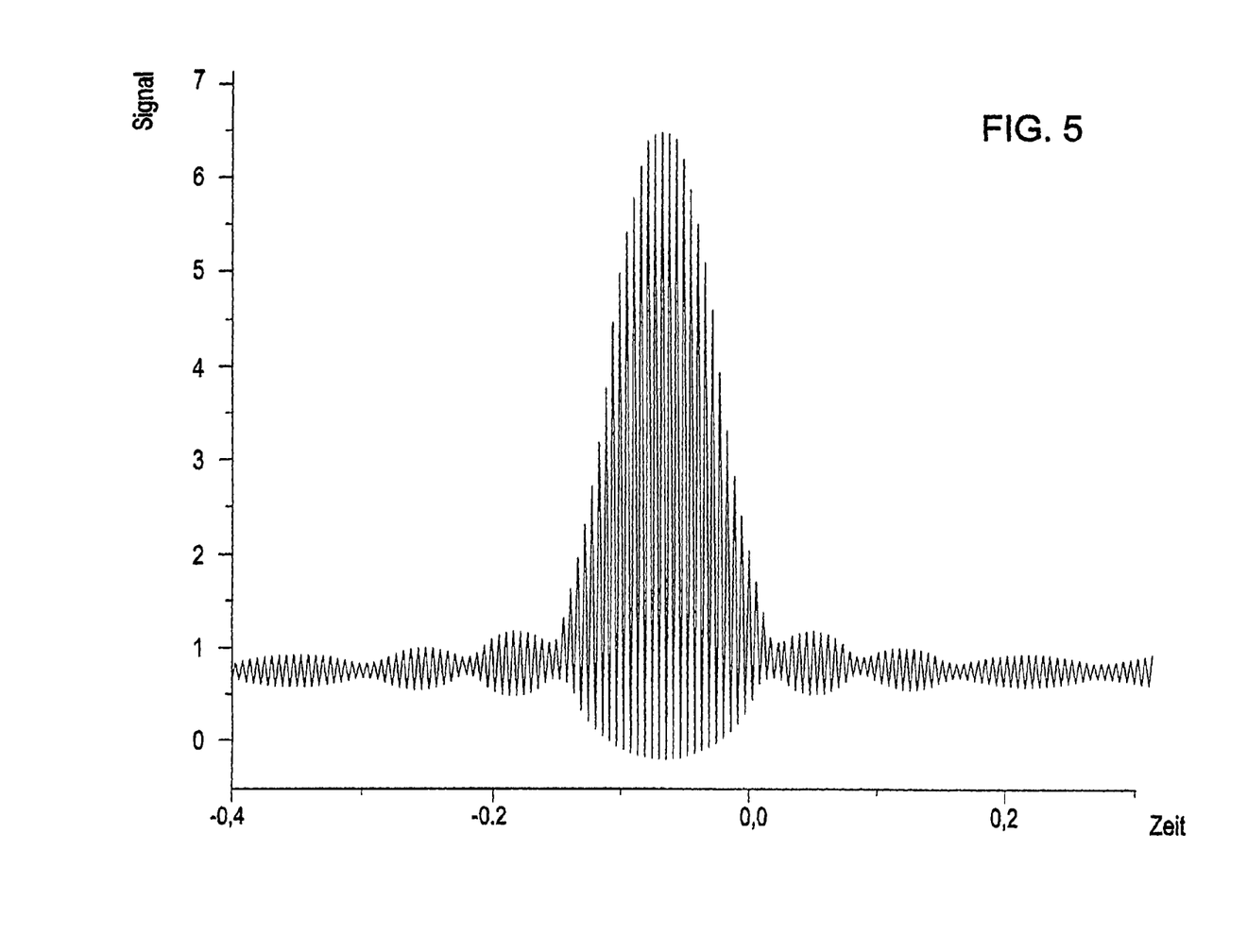
FIG. 5 shows an autocorrelation measurement result with the signal intensity, in arbitrary units, versus time (also in arbitrary units) in a diagram.

In FIG. 5, in a diagram of a signal autocorrelation measured in an actual test set-up, the signal intensity (in an arbitrary unit) over time (also in an arbitrary unit) is shown, a pulse duration of 27 fs being calculable therefrom.

Figure 6:
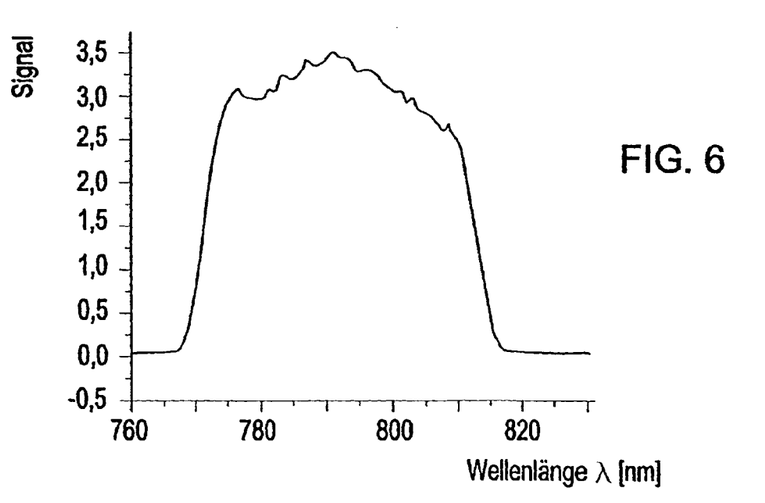
FIG. 6 shows a spectrum belonging to this measured autocorrelation according to FIG. 5 in a diagram.

In FIG. 6, an associated spectrum is illustrated, wherein again the signal intensity is shown in an arbitrary unit, now above the wavelength λ in nm.

The pulse energy achieved in this example was higher than 200 nJ, this being so at a repetition rate of 11 MHz, with a wavelength range Δλ of approximately 40 nm.

The invention claimed is:

1. A short-pulse laser arrangement comprising:
a resonator comprising resonator components including a laser crystal, a plurality of mirrors including a pump beam coupling-in mirror, a laser beam out-coupling mirror and a multiple reflection telescope for enlarging an effective length of the resonator, a first set of the resonator components having a positive group delay dispersion;
said plurality of mirrors including dispersive mirrors with a negative group delay dispersion for compensating in part the positive group delay dispersion of the first set of the resonator components;
said resonator in operation having a positive net averaged group delay dispersion over an operating wavelength range and the net averaged group delay dispersion is constant over the operating wavelength range, the resonator in operation generating laser pulses having an energy higher than 200 nJ, wherein the positive net averaged group delay dispersion of the resonator is in a range between 0 and 100 $fs^2$.

2. The short-pulse laser arrangement of claim 1, wherein the positive net averaged group delay dispersion is in a range between 0 $fs^2$ and 50 $fs^2$.

3. The short-pulse laser arrangement of any one of claims 1 or 2, wherein the multiple reflection telescope comprises at least one of the dispersive mirrors with the negative dispersion.

4. The short-pulse laser arrangement of claim 3, wherein all the mirrors of the resonator are the dispersive mirrors with the negative dispersion.

5. The short-pulse laser arrangement of any one of claims 1 or 2, the resonator comprising a pair of glass wedges with positive dispersion configured to provide a supplementary dispersion fine adjustment.

6. The short-pulse laser arrangement of any one of claims 1 or 2, wherein the laser arrangement is configured to provide passive mode-locking.

7. The short-pulse laser arrangement of claim 6, wherein a Kerr-lens mode-locking principle is used for the passive mode-locking.

8. The short-pulse laser arrangement of claim 6, comprising a saturable absorber positioned and configured to perform the passive mode-locking.

9. The short-pulse laser arrangement of claim 1, wherein an entirety of the negative dispersion of the resonator is determined only by the dispersive minors with the negative dispersion.

10. The short-pulse laser arrangement of claim 1, wherein the positive net averaged group delay dispersion is between 0 and 50 $fs^2$ and is provided over a bandwidth of at least 280 nm.

11. The short-pulse laser arrangement of claim 10, wherein the positive net averaged group delay dispersion is provided over a bandwidth in a range of 680 nm to 960 nm.

* * * * *